United States Patent
Chen

[11] Patent Number: 6,074,090
[45] Date of Patent: Jun. 13, 2000

[54] ELECTRONIC CLINICAL THERMOMETER

[76] Inventor: Hui-Ming Chen, No. 77, Section 1, Chan Sway Road, Pu Yen Hsiang, Changhua, Taiwan

[21] Appl. No.: 09/088,661

[22] Filed: Jun. 2, 1998

[51] Int. Cl.[7] .............................. G01K 1/00; G01K 7/22; G01K 1/08
[52] U.S. Cl. .......................... 374/183; 374/158; 374/208; 374/163
[58] Field of Search .................................... 374/183, 158, 374/208, 185, 163, 170

[56] References Cited

U.S. PATENT DOCUMENTS

| | | | |
|---|---|---|---|
| 4,461,584 | 7/1984 | Murase | 374/185 |
| 4,743,121 | 5/1988 | Takagi et al. | 374/208 |
| 4,813,790 | 3/1989 | Frankel et al. | 374/208 |
| 5,133,606 | 7/1992 | Zaragoza et al. | 374/208 |
| 5,165,798 | 11/1992 | Watabane | 374/158 |
| 5,720,556 | 2/1998 | Krellner | 374/208 |

Primary Examiner—Diego Gutierrez
Assistant Examiner—Gail Verbitsky
Attorney, Agent, or Firm—Bacon & Thomas, PLLC

[57] ABSTRACT

An electronic clinical thermometer including a thermistor, a probing bar, a main body, an electronic device, a display, an inner shell and a buzzing device. The probing bar is highly flexible to minimize discomfort or irritation arising from the measurement of the body temperature of a person. The electronic device can be easily joined with the inner shell such that the electronic device is held securely by the retainers of the inner shell.

7 Claims, 4 Drawing Sheets

ELECTRONIC CLINICAL THERMOMETER

BACKGROUND OF THE INVENTION

1. Field of the Invention

The present invention relates generally to a clinical thermometer, and more particularly to an electronic clinical thermometer.

2. Description of the Related Art

The U.S. Pat. No. 5,013,161 discloses an electronic clinical thermometer having a soft shell to prevent discomfort or even irritation that may arise at the time when the body temperature is measured with the electronic clinical thermometer. Such a prior art electronic clinical thermometer as described above is defective in design in that its component parts can not be easily assembled, and that its soft shell is not soft enough to achieve the intended effect, and further that it is made of a PVC (polyvinyl chloride) plastic material containing a stabilizing agent, such as lead salt, tin-containing organic compound, or metallic soap. The stabilizing agent is generally composed of a toxic substance in minute quantity. As a result, the prior art electronic clinical thermometer referred to above is not suitable for use in measuring the oral temperature.

SUMMARY OF THE INVENTION

It is therefore the primary objective of the present invention to provide an electronic clinical thermometer with a relatively flexible probing bar to avert discomfort or irritation arising from the measuring of the body temperature.

It is another objective of the present invention to provide an electronic clinical thermometer that is safe to use in measuring the oral temperature.

It is still another objective of the present invention to provide an electronic clinical thermometer which is relatively simple in construction and is thus cost-effective.

The foregoing objectives, features, functions, and advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
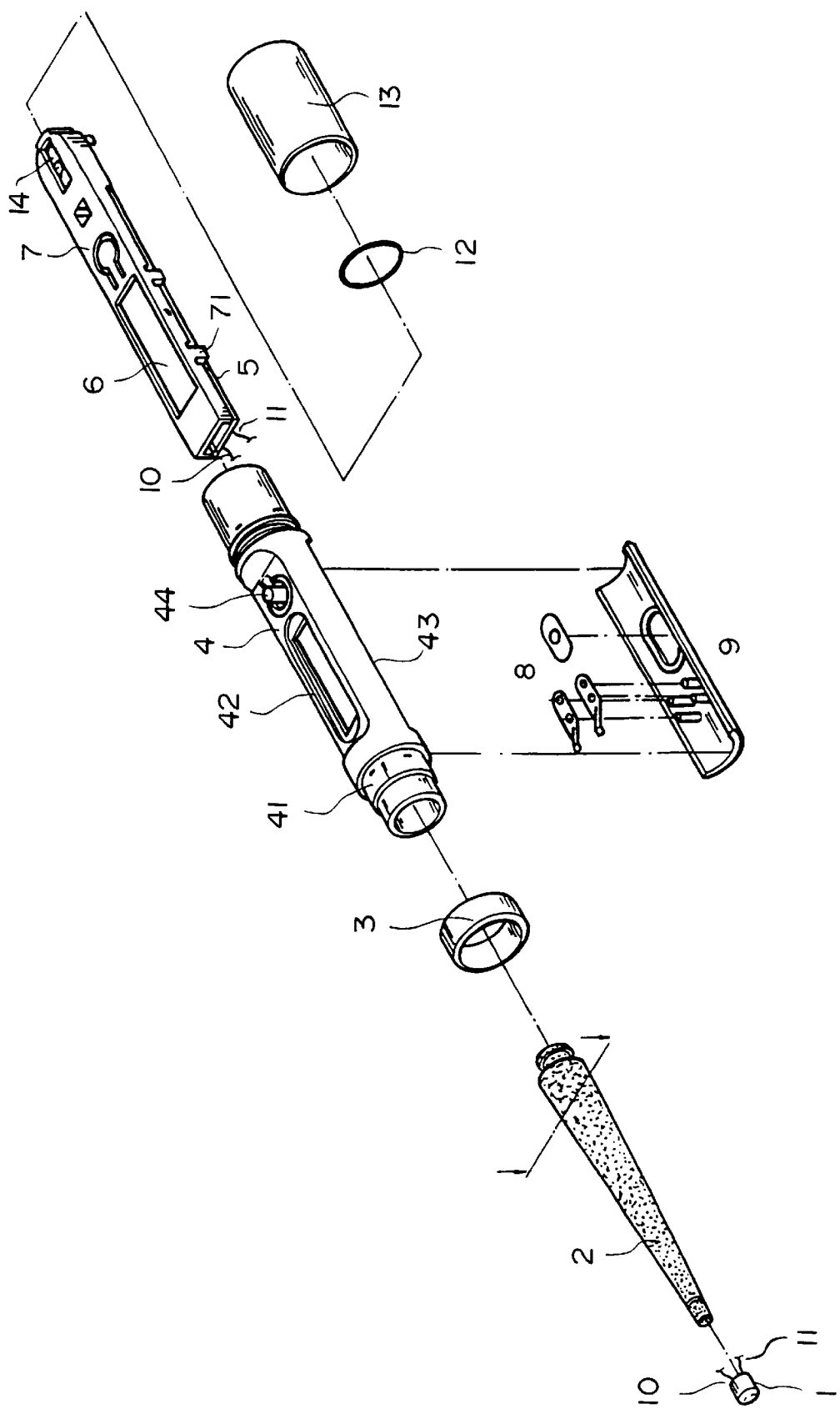
FIG. 1 shows an exploded view of an electronic clinical thermometer embodied in the present invention.
Figure 2:
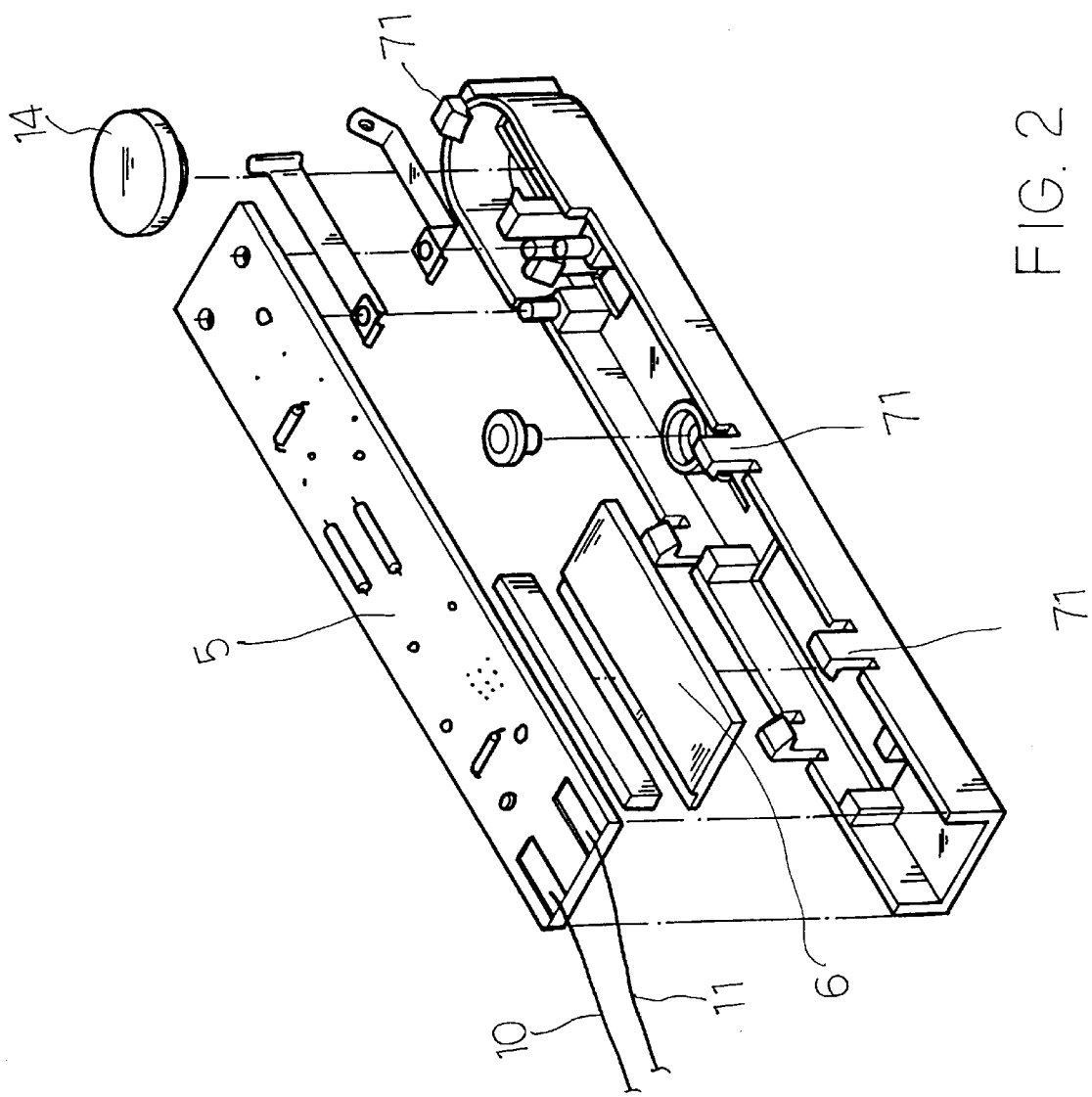
FIG.2 shows a partial exploded view of the display components of the electronic clinical thermometer of the present invention

As shown in FIGS. 1–4, an electronic clinical thermometer embodied in the present invention is composed of a thermistor 1, a probing bar 2, a restraining ring 3, a main body 4, an electronic device 5, a display 6, an inner shell 7, a buzzing device 8, a bottom plate 9, two guide wires 10 and 11, a washer 12, and an end cap 13.

The thermistor 1 is connected with two guided wires 10 and 11, and is fastened with a front end of the tapered probing bar 2 of a silicon rubber material. The probing bar 2 has a hollow interior 21 in which the guide wires 10 and 11 are located. The probing bar 2 is fastened at the rear end thereof with a front end 41 of the main body 4 in conjunction with a restraining ring 3 which is engaged with the front end 41 of the main body 4. The main body 4 is made of a mixture of acrylonitrile butadiene styrene (ABS) and plastic. The main body 4 has a hollow interior, a window 42, a slot 43, and a button 44. The inner shell 7 is made of a rigid plastic material and is provided in the periphery thereof with a plurality of retainers 71 for retaining the electronic device 5, the display 6 and a battery 14. The inner shell 7 houses a switch actuated by the button 44 for starting the electronic device 5. The inner shell 7 is disposed in the hollow interior of the main body 4. The electronic device 5 is connected with the guided wires 10 and 11, and is fastened with the display 6 of liquid crystal. The temperature signal is transmitted from the thermistor 1 to the electronic device 5 in which the signal is processed. The signal is then transmitted to the display 6 to exhibit the visual representation of data. The buzzing device 8 is mounted on the bottom plate 9 and connected with the electronic device 5. The buzzing device 8 is capable of making a buzzing sound as a signal to remind the user of the thermometer that the pre-set measuring time is up. The bottom plate 9 is fastened with the slot 43 of the main body 4.

Figure 3:
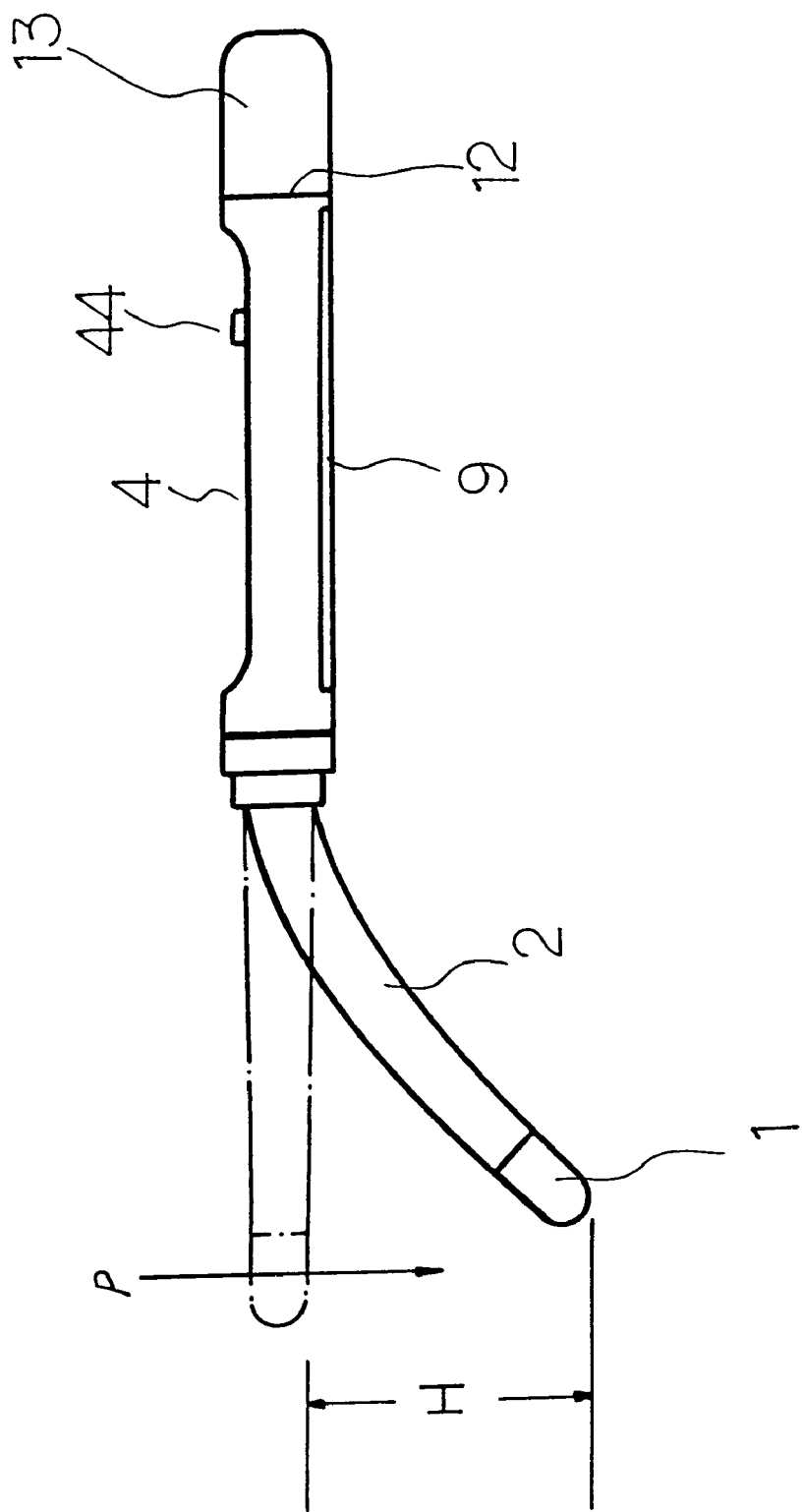
FIG.3 shows a schematic view of the probing bar of the present invention at work.
Figure 4:
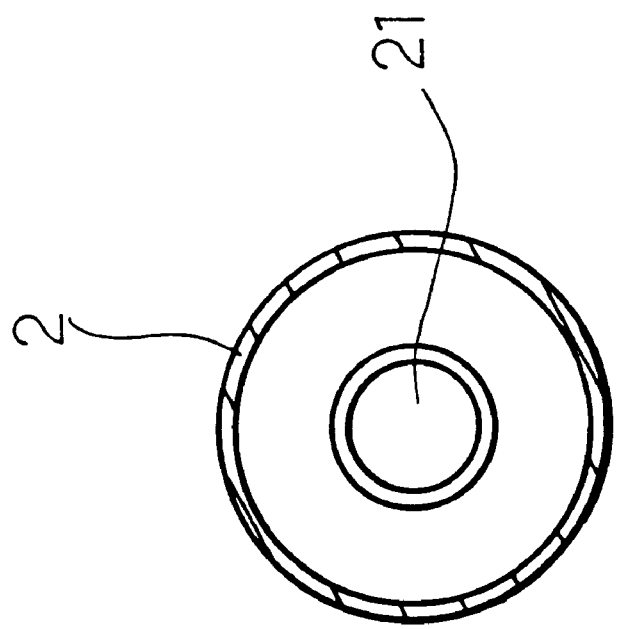
FIG.4 shows a cross sectional view of the probing bar of the present invention.

The probing bar 2 of the present invention is made of the silicon rubber material which is not toxic and has an excellent flexibility. The probing bar 2 has a curvature which can be as long as 3 cm, as illustrated in FIG. 3.

The present invention has another advantage in that the electronic device 5 can be easily joined with the inner shell 7, and that the electronic device 5 is securely retained by the retainers 71 of the inner shell 7. In addition, the electronic device 5 is protected from the moisture by the washer 12.

The embodiment of the present invention described above is to be deemed in all respected as being merely illustrative and not restrictive. Accordingly, the present invention may be embodied in other specific forms without deviating from the spirit thereof. The present invention is therefore to be limited only by the scopes of the following appended claims.

What is claimed is:

1. An electronic clinical thermometer comprising:

a thermistor connected to two guide wires;

a probing bar made of a silicon rubber material having a hollow interior and front and rear ends, the front end of said probing bar attached to the thermistor such that said two guided wires are located within the interior of said probing bar;

a main body having a front and rear, a hollow interior, a slot, an upper surface and an underside made of a mixture of acrylonitrile butadiene styrene (ABS) and plastic, the front of said main body attached to the rear end of said probing bar, said main body including a window and a button positioned at the upper surface of said main body, and a slot positioned at the underside of said main body;

a rigid inner shell made of a plastic material having a rear end and a periphery thereof with a plurality of retainers and a switch, said inner shell being housed in the hollow interior of said main body;

a bottom plate fastened to the slot of said main body;

a buzzing device mounted on said bottom plate;

an electronic device including a display and adapted to be powered by a power source, said electronic device connected to said buzzing device, said electronic device attached to said inner shell such that said electronic device is activated by pressing the button of said main body, which actuates the switch housed in said inner shell to energize said buzzing device to produce an audible sound to remind a user that a pre-set time has expired, and said electronic device connected to said two guide wires;

the retainers of said inner shell configured to secure said electronic device to said inner shell; and said display connected to said electronic device and configured to exhibit visual representation of data transmitted from said electronic device.

2. The electronic clinical thermometer as claimed in claim 1, wherein said probing bar is tapered toward the front end of said probing bar.

3. The electronic clinical thermometer as claimed in claim 1, wherein the rear end of said probing bar is attached to the front of said main body in conjunction with a restraining ring.

4. The electronic clinical thermometer as claimed in claim 1, wherein said display is a liquid crystal display.

5. The electronic clinical thermometer as claimed in claim 1, wherein said electronic device is held by said retainers of said inner shell.

6. The electronic clinical thermometer as claimed in claim 1, wherein a cap is attached to the rear of said main body.

7. The electronic clinical thermometer as claimed in claim 6, wherein a washer is positioned between the rear end of said inner shell and the rear of said main body.

* * * * *